United States Patent Office 2,955,384
Patented Oct. 11, 1960

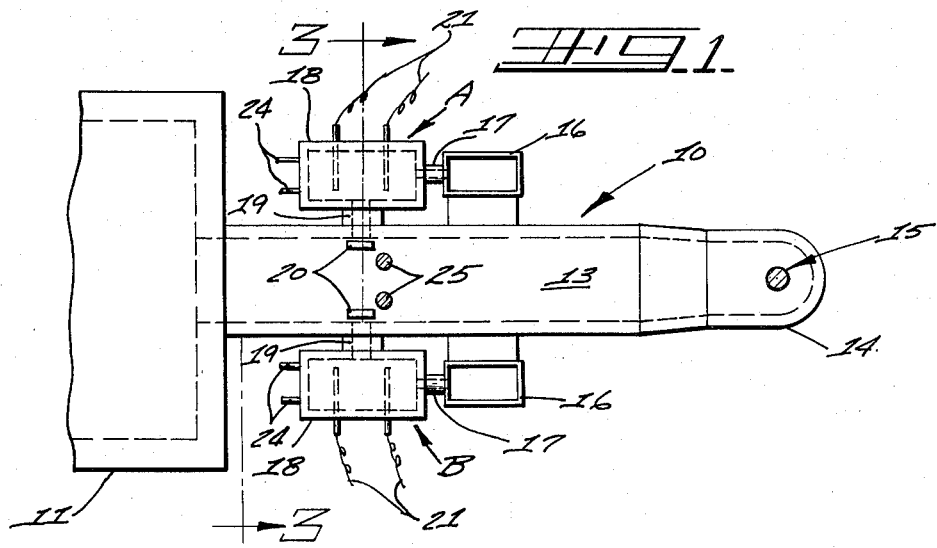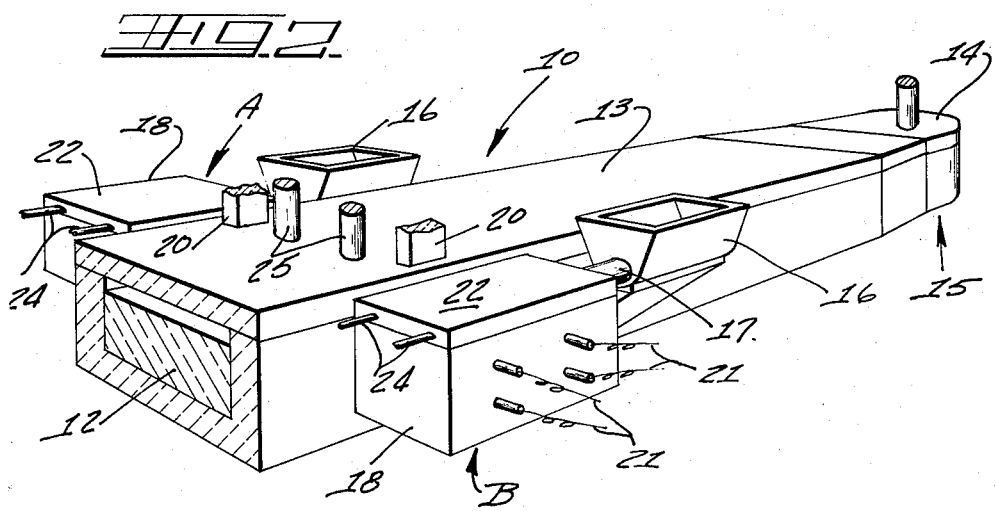

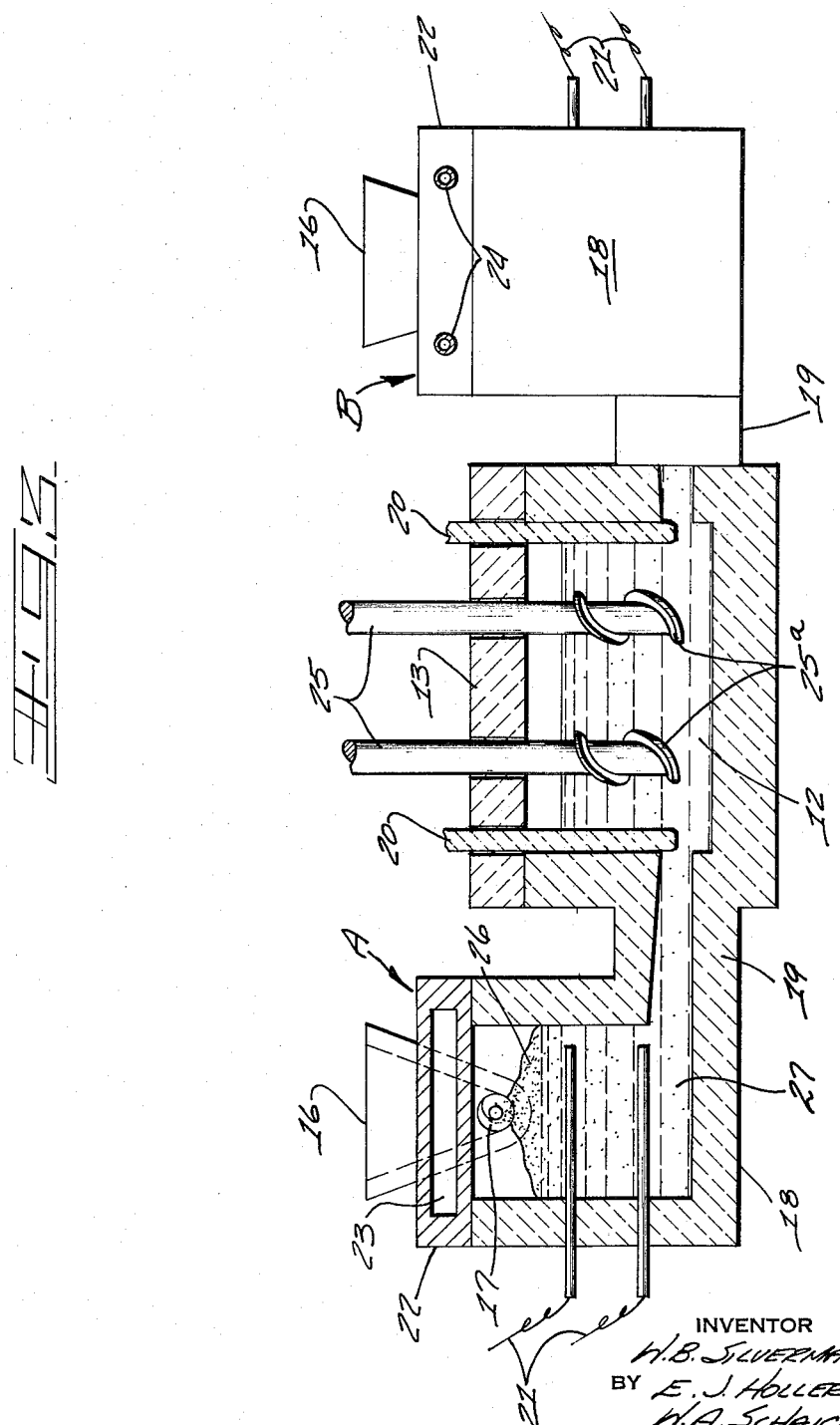

2,955,384

APPARATUS FOR PRODUCING COLOR-CONTROLLING VITREOUS MATERIALS

William B. Silverman, Toledo, Ohio, assignor to Owens-Illinois Glass Company, a corporation of Ohio Filed Feb. 27, 1958, Ser. No. 718,024

1 Claim. (Cl. 49—54)

The present invention relates to improved apparatus adapted to facilitate the continuous production of molten color-controlled vitreous materials such as glass or ceramics. The invention is particularly applicable to the automatic manufacturing of various color-controlled glasses produced within tank furnaces wherein the glass is partially refined and conveyed through a forehearth wherein the glass is finally conditioned prior to its discharge and use.

In conventional processes heretofore employed considerable difficulty has been encountered in continuously producing controllably decolorized or slightly colored glass with certain color-controlling reagents. A primary reason for this has been due to the high volatility of constituents such as selenium when introduced with the bulk of the glass batch into the melting chamber of the tank. Selenium finds wide application as a decolorizer for iron, for example. Decolorizing constituents which contain selenium in its various forms when introduced into the batch have been adversely affected by the excessive heat present in the melting chamber to the extent that substantial losses of such costly constituents have resulted. In order to counteract the high selenium losses normally encountered in the melting chamber, considerably greater amounts than necessary to perform its color-controlling function must be added to the batch. Thus, to effect a proper degree of decolorization or selective colorization of the molten glass, only a small portion of the total amount of selenium added becomes an effective reactant in the molten glass.

Furthermore, the glass is retained for such a relatively long period and is subjected to such high heat, that along with atmospheric conditions within the tank being spasmodically out of control, the state of oxidation or reduction of the melt may vary uncontrollably. Thus, where selenium or chromium are introduced with the glass batch, little control over the oxidation level of these constituents may be maintained at the point of discharge of the molten glass.

The apparatus in accordance with my invention consists of color-controlling mechanism adjacent a glass retaining forehearth for incorporating into the batch of raw molten glass a moderating additive glass to intermix therewith and effect the color-controlling operation. The decolorizing or colorizing agent may be incorporated into an additive glass supply in a large proportion and intermixed with the main body of molten glass in the forehearth, one region of which serves as an intermediate homogenizing area. A homogeneous continuous stream of color-controlled molten glass free from streaks or cords is furnished in the downstream area of the forehearth immediately adjacent the location where the color-controlling glass is introduced. Thus, the operations of adding the color-controlling additive glass into the raw molten glass and rendering the mixture completely uniform may be accomplished in a continuous manner while the primary glass stream flows past an intermediate area of the forehearth to a point of use.

Control of the oxidized state of selenium is more easily accomplished in the present invention by the composition of the concentrated additives in the batch, the controlled melting and cooling of the selenium containing batch, and relatively short exposure to high temperatures where shifts in equilibrium may take place. Thus, selenium may be introduced in the oxidized form ($SeO_4^{--}$) by incorporating nitrates or nitrate and arsenic in the batch. It may be utilized in the metallic form ($Se^0$) by oxidants, or rendered to the reduced state ($Se^{--}$ etc.) by reductants such as carbon. The precise state of oxidation of the selenium controls the exact shade of color imparted to the main body of glass for various purposes.

Accordingly, it is an object of the present invention to provide apparatus for the continuous production of homogeneous color-controlled glass by adding the color-controlling additive-type glass of different composition to a molten glass stream beneath its surface, the apparatus being adapted to combining the glasses in required proportions at a controlled rate.

Another object of this invention is to provide apparatus which is applicable to introducing high selenium content additive glass into the main body of raw molten glass continuously and at a controlled rate governed by the degree of colorization or decolorization required and the rate of removal of the color-controlled homogeneous glass.

Another object of this invention is to provide apparatus for controlling the state of oxidation or reduction of the molten glass near its discharge and use zone and thus coloration of the prepared glass.

A further object of the present invention is to provide an improved apparatus for continuously producing color-controlled molten glass by the addition of a high selenium-content additive glass incorporated into the main body of glass beneath its surface and intermixing the two in a homogenizing zone thereby rendering the resultant product either fully decolorized or slightly colorized as required.

A still further object of the present invention is to provide an improved apparatus for producing a continuous stream of color-controlled molten glass by introducing a high selenium content molten additive glass into a continuously flowing main stream of raw molten glass beneath its surface, the additive glass being melted in at least one side channel adjacent to and interconnecting with a delivery forehearth, accumulating means being present in said side channel to retain the selenium of the molten additive glass, its rate of incorporation being completely controlled to achieve the desired results in the color-controlling operation.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a top plan view of a preferred embodiment of apparatus for performing the color-controlling operation in accordance with the present invention.

Fig. 2 is an enlarged prospective view of the forehearth portion of Fig. 1 illustrating the apparatus for introducing the color-controlling reagent into the molten glass stream.

Fig. 3 is a further enlarged vertical sectional view taken along the line 3—3 of Fig. 1 further illustrating the apparatus.

The present color-controlling apparatus and process which are described herein have numerous important advantages over those methods of adding costly color-controlling elements such as selenium to the complete batch as compounded, wherein they are combined with the batch in unmelted form and introduced into the so-called "doghouse" end of the glass melting chamber. As pointed out costly color-controlling ingredients such as selenium compounds cannot be fully utilized during the conversion of the raw batch to molten glass and frequently as much as 90% of the selenium is lost during single step glass melting in a large glass tank. Thus, it is not uncommon for only about 10% of the total selenium content of the batch to serve effectively as the decolorizing or color-controlling medium.

While the present invention will be described as directed primarily to the application of selenium to molten glass to achieve color-control thereof, the invention is deemed to be fully applicable to the addition of other minor constituents to molten glass which may or may not be especially volatile, where for various reasons, it may be desirable to add these constituents to continuously produced molten glass for additional refining or controlling the state of oxidation of the melt.

As shown in Fig. 1, the apparatus 10 comprises a refractory tank or melting chamber 11 having a bottom and upright side wall portions to retain the molten glass 12. The chamber 11 may also consist of a refiner attached to the main melting chamber of the furnace to condition and refine the molten glass 12 prior to its passage into the forehearth 13. Also the glass may be further refined and its temperature regulated in a conventional manner within both the chamber 11 and forehearth 13.

The molten glass 12 which is contained within tank 11 may be considered to possess various objectionable colorations such as slight bluish or greenish tints due to certain impurities contained within the glass batch from which the molten glass has been commercially prepared. As known some of these impurities may consist of various forms of iron, chromium, or other impurities which must be counteracted by certain color-controlling compounds such as zinc selenate, barium selenate, sodium selenate, or selenium metal for example. Molten glass 12 retained within tank 11 flows generally in the direction of from the tank through forehearth 13 to a feeder 14 having a delivery outlet 15 (left to right as shown in Fig. 1).

Duplicate mechanisms A and B are provided on each side of forehearth 13 in an intermediate area to facilitate the independent or conjunctive addition of a continuous supply of additive glass to the primary glass stream 12. Color-controlling material 26 which may consist of various oxides of glass-forming constituents plus a decolorizer containing selenium is placed in hoppers 16 oppositely disposed on either side of the forehearth 13. Taking mechanism A as representative, a motor-driven feeder 17 feeds and controls the flow of the raw batch 26 of the additive glass through a horizontal tube extending into covered melting container 18. The material 27 is thus delivered into the melting chamber 18 where it is distributed over the surface of the contained molten additive glass 27 as a blanketing layer so that it is continually melted and intermixed with the glass prior to its being conveyed through a side duct 19 into the interior of the forehearth 13.

Regulating gates 20 are mounted at the intersection of channels 19 and the forehearth 13 at a position adjacent to the inner sidewall of the forehearth. Thus by individually raising or lowering the gate-type device 20 the amount of additive glass 27 melted within either side chamber 18 and supplied to the main body of glass 12 is controllable. Each gate 20 extends exteriorly beyond the top of the forehearth 13 and may be adjustably arranged in a fixed position.

Several pairs of electrodes 21 extend into the body of additive glass 27 within chamber 18 and are energized by an electric circuit to provide heat throughout the mass of molten glass thereby creating convection current motion which not only serves to further admix the raw batch 26 and the previously melted glass 27, but also presents a minimum amount of exposed surface of the molten glass to the melting heat to minimize losses of volatile components. Thus, heat is applied primarily internally of the mass to hasten the melting of the additive glass 27 and to appreciably increase the amount of glass which may be effectively introduced into the color-controlling zone of the forehearth within a prescribed time interval.

Each of the side chambers 18 is provided with a metal top plate 22 having a hollow cavity 23 through which is circulated a fluid coolant such as water to maintain the overlying internal surface of the melting chamber 18 at minimal temperatures for collection of volatilizable components of the additive glass. Top plate 22 also cools the top surface portion of the incoming batch which acts as a primary condensing medium. Thus, any sublimation of the selenium which occurs within the container 18 is met by the cooled surface of the batch or top plate 22 within or on which it accumulates. Hollow chamber 23 is supplied the coolant by inlet and outlet lines 24.

Stirring elements 25 having screw-threaded portions 25a extend into the forehearth through its top surface into the main stream of molten glass. The stirring elements may be in the form of vanes, screws or blades and may be two or more in number disposed in aligned or staggered relationship within the arc of the forehearth immediately downstream of the interconnecting side channels 19. The shafts of the stirring elements 25 are rotated continuously by a motor and driving connection (not shown) with the required speed reducing gear to furnish the required speeds of rotation. The rotation of the stirrers 25 causes the surface portions of the glass 12 to move downwardly in their immediate area and flow across the bottom surfaces and upwardly along the sidewalls to the glass surface. The stirrers are driven at such speed to cause the vigorous intermixing of the primary body of glass 12 and the rather small side stream of additive glass 27 flowing into the forehearth. The required stirring obviously may be obtained by rotation of the stirrers in either direction.

Thus, the subject method envisions the attachment of a relatively small electric melting chamber to the side of a glass feeder panel or forehearth. The additive type glass or vitreous matter preferably used is one having the form of glass containing a large proportion of coloring or decolorizing matter. The raw batch of additive material blankets the previously melted material within the supplementary melting chamber which is covered with a water cooled steel plate, for example. An oxidized bath comprising a high selenium content material is fed into the chamber and melted and refined therein at a lower temperature than required for ordinary soda-lime glass compositions. The lower melting temperature and the condensation of volatilized selenium in the surface-cooled batch blanket combined with final condensation of any escaping vapor on the cooled metal plate assures the use of substantially all of the selenium for the intended purpose.

Each of the independent melting units A and B is connected through the side wall of the glass feeder channel in a manner such that the high selenium glass will flow under the proper head at a controlled rate into the forehearth through a relatively small opening at a point approximately at the bottom of the feeder channel. The higher temperature of the primary glass stream flowing within the channel plus the high diffusion rate of selenium will decolorize or slightly colorize as desired the molten glass within the channel. The much lower temperature of the glass within the feeder as compared with that in its main melting chamber combined with the shorter time of exposure of the selenium content will minimize losses in the channel as compared with regular or known decolorizing procedures.

In this invention I control the final state of oxidation of the discharged glass to a fuller extent than heretofore possible. In fully decolorized glass the highest state of oxidation of selenium is desirable. In glass containers used for milk bottles, it is frequently more desirable to obtain a flesh color in the final glass, indicative of a lower state of oxidation. In many cases as now practiced, arsenic is omitted from the batch to attain such colors.

The supplementary electric melting chambers should have areas at least of approximately 15 square inches and the electrical power involved for melting the high selenium glass is normally less than 7 kilowatts per channel.

Various modifications may be resorted to within the spirit and scope of the appended claim.

I claim:

Apparatus for continuously producing a molten homogeneous color-controlled glass product comprising, in combination, a refractory furnace adapted to melt glass batch constituents into molten form, a refractory forehearth extending from said furnace adapted to deliver the said glass product to a point of use, a pair of oppositely disposed enclosed side chambers interconnected to an intermediate area of said forehearth, a plurality of electrode elements disposed within each of said side chambers projecting into a batch of glass-making raw materials to melt therein an additive glass having a high selenium content, cooled collection members enclosing the top portions of said side chambers adapted to accumulate volatile constituents of said additive glass including selenium during its melting, gate members disposed within an interconnecting region of said side chambers and said forehearth adapted to control the introduction of additive glass into the main body of conveyed glass, and at least one stirring element disposed in said forehearth adjacent the interconnection of said side chambers and said forehearth for homogenizing the molten glass into a color-controlled product.

References Cited in the file of this patent

UNITED STATES PATENTS

| | | |
|---|---|---|
| 576,312 | Hirsch | Feb. 2, 1897 |
| 805,139 | Hitchcock | Nov. 21, 1905 |
| 2,115,408 | Brosse | Apr. 26, 1938 |
| 2,148,345 | Freudenberg | Feb. 21, 1939 |
| 2,268,247 | Fox | Dec. 30, 1941 |
| 2,397,852 | Gentil | Apr. 2, 1946 |
| 2,538,956 | Arbeit | Jan. 23, 1951 |
| 2,753,256 | Olson | July 3, 1956 |

FOREIGN PATENTS

| | | |
|---|---|---|
| 667,474 | Great Britain | Mar. 5, 1952 |